UNITED STATES PATENT OFFICE.

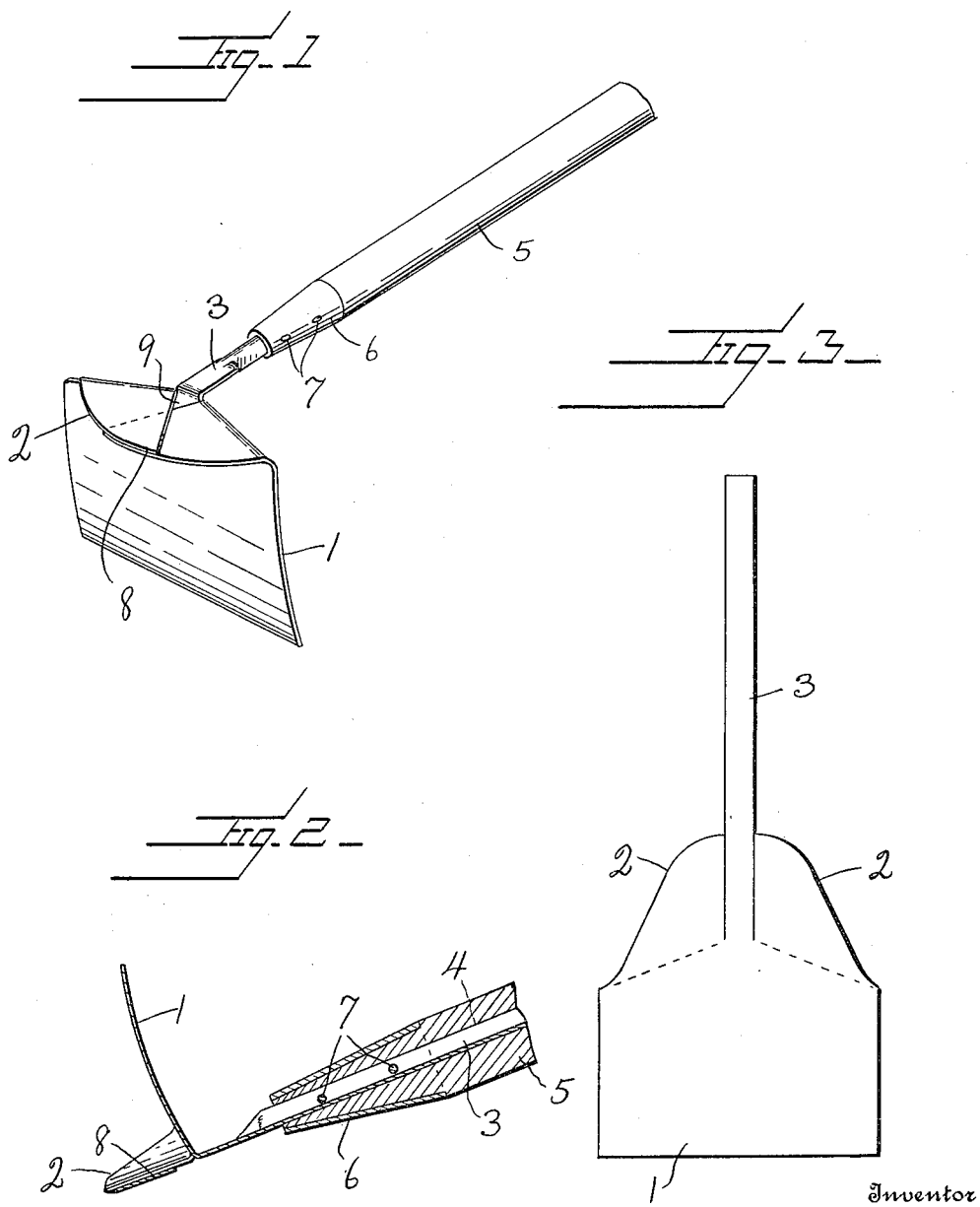

SUSIE HILL, OF BELEN, MISSISSIPPI.

TOOL.

1,148,678.   Specification of Letters Patent.   Patented Aug. 3, 1915.

Application filed March 3, 1915. Serial No. 11,808.

*To all whom it may concern:*

Be it known that I, SUSIE HILL, a citizen of the United States, residing at Belen, in the county of Quitman and State of Mississippi, have invented certain new and useful Improvements in Tools, of which the following is a specification, reference being had to the accompanying drawings.

This invention relates to new and useful improvements in tools and more particularly to what will be hereinafter known as a combined hoe and weeder, the main object of the present invention being the provision of a combined weeder formed of a single piece of material, the weeder or cutter being stamped from an extension at one end of the body of the hoe.

Another object of the present invention is the provision of a hoe wherein the blade is stamped from a single piece of material and one end thereof is reduced and slotted, the ends of the reduced portion being bent inwardly and arranged in cross relation to form a cutting blade or weeder and the material cut or slit from between these parts being extended at right angles to the body of the hoe and adapted to form a stem for engagement with a handle, thus providing what will be known as a single piece tool.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a detail perspective view of a hoe constructed in accordance with my invention. Fig. 2 is a longitudinal sectional view, the handle being broken away; and Fig. 3 is a plan view illustrating the blank from which my hoe is constructed.

Referring more particularly to the drawing, 1 indicates the hoe blade, one end of which is substantially reduced and provided with an arcuate edge, as shown at 2. This reduced portion is slit up the center, the material cut therefrom being extended rearwardly to form the stem 3 of the hoe blade. This stem 3 is arranged within a socket 4, formed in the outer end of the handle 5 and is securely held in position by means of a sleeve 6 which engages over the outer end of the handle and extended through the sleeve, the handle and the stem 3, are suitable rivets 7 which securely retain the same within the handle.

The reduced portion at the inner end of the hoe blade is divided into sections by slitting through the center thereof, the sections being bent over on to each other, as shown at 8, forming a substantially triangular opening 9 at the intersection of the stem 3 and the hoe blade 1. It will be noted that by bending the sections of the extended end of the hoe blade, inwardly on to each other, as disclosed, they will form a cutting edge, providing means whereby weeds and other growth may be loosened from the ground and the dirt removed from the weeds by shaking the same from the weeder, as in the formation of the weeder, there is provided a sort of pocket between the outer face of the hoe blade 1 and the portions forming the weeder, it being understood that the dirt from the weeds will pass down through the opening 9, while the weeds will be retained within the pocket and, after the dirt has been removed from the weeds, the weeds are thrown to one side in a pile.

From the above description taken in connection with the accompanying drawing, it will be readily apparent that I have provided a simple and durable tool which is formed of a single piece of material and by forming the same in this manner, it provides for greater strength than if the tool was made of two or more pieces of material. It will also be apparent that this tool can be readily stamped from heavy sheet metal at a comparatively low cost. It will also be understood that while I have shown and described the preferred form of means for securing the shank 3 within the handle 5, it will be obvious that any other desirable means may be used.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I desire to claim as new and secure by Letters Patent, is:—

1. A hoe consisting of a single piece of material curved to form a cutting blade, one edge of said cutting blade being provided with an arcuate reduced portion and being slit longitudinally through the center thereof to form a shank, the material upon opposite sides of the shank being bent inwardly to overlap each other and form a cutting blade disposed at right angles to the first cutting blade.

2. A hoe consisting of a single piece of material having one end bent to form a cutting blade substantially arcuate in cross section, the other end of said blade being provided with an arcuate reduced portion, said arcuate reduced portion being slit through the center and the material cut from said slit being bent at right angles to form a shank, the material upon opposite sides of the slit being bent inwardly toward each other and overlapped to form a cutting blade.

3. A hoe consisting of a single piece of material bent to form a cutting blade, and a portion which extends at substantial right angles thereto, said portion being provided with parallel slits to release a shank which is bent to extend at approximate right angles to the cutting blade and from the opposite side thereof from which said portion extends, the sections of material upon opposite sides of the shank being disposed to conjointly constitute a second cutting blade.

In testimony whereof I hereunto affix my signature in the presence of two witnesses.

SUSIE X HILL.
her mark

Witnesses:
I. C. DENTON,
J. W. ROBERTS, Jr.

Copies of this patent may be obtained for five cents each, by addressing the "Commissioner of Patents, Washington, D. C."